US00RE45886E

(19) United States
(12) Reissued Patent
Nakata et al.

(10) Patent Number: US RE45,886 E
(45) Date of Reissued Patent: Feb. 9, 2016

(54) INFORMATION SIGNAL TRANSMISSION SYSTEM AND REMOTE CONTROL DEVICE FOR THE SAME

(75) Inventors: Junichi Nakata, Tokyo (JP); Yoshihiro Wakita, Tokyo (JP)

(73) Assignee: SONY CORPORATION, Tokyo (JP)

(21) Appl. No.: 13/472,538

(22) Filed: May 16, 2012

Related U.S. Patent Documents

Reissue of:
(64) Patent No.: 7,917,930
Issued: Mar. 29, 2011
Appl. No.: 11/498,388
Filed: Aug. 3, 2006

U.S. Applications:
(63) Continuation of application No. 08/977,591, filed on Nov. 25, 1997, now Pat. No. 7,194,755.

(30) Foreign Application Priority Data

Nov. 26, 1996 (JP) ..... 8-330439

(51) Int. Cl.

| | |
|---|---|
| ***H04N 7/18*** | (2006.01) |
| ***H04N 7/173*** | (2011.01) |
| ***H04N 5/44*** | (2011.01) |
| ***H04L 12/28*** | (2006.01) |
| ***H04N 21/422*** | (2011.01) |
| ***H04N 21/436*** | (2011.01) |

(52) U.S. Cl.
CPC ..... *H04L 12/2805* (2013.01); *H04L 12/282* (2013.01); *H04N 21/42204* (2013.01); *H04N 21/43615* (2013.01)

(58) Field of Classification Search
CPC ..... H04N 21/43615; H04N 21/42204; H04L 12/2805; H04L 12/282
USPC ..... 725/78, 80, 82, 85, 93–95, 116, 146, 725/86; 348/734
See application file for complete search history.

(56) References Cited

U.S. PATENT DOCUMENTS

| | | | | | |
|---|---|---|---|---|---|
| 4,439,784 | A | * | 3/1984 | Furukawa et al. | 725/25 |
| 4,885,803 | A | | 12/1989 | Hermann et al. | 348/734 |
| 5,130,793 | A | * | 7/1992 | Bordry et al. | 725/78 |
| 5,132,679 | A | | 7/1992 | Kubo et al. | 340/825.22 |
| 5,226,090 | A | | 7/1993 | Kimura | 381/110 |
| 5,287,547 | A | | 2/1994 | Hidaka | 455/3.04 |
| 5,307,055 | A | * | 4/1994 | Baskin et al. | 345/2.2 |
| 5,321,846 | A | | 6/1994 | Yokota et al. | 725/80 |
| 5,402,115 | A | | 3/1995 | Tanaka | 340/3.1 |
| 5,402,183 | A | * | 3/1995 | Tanaka | 348/705 |
| 5,418,527 | A | | 5/1995 | Yashiro | 340/825.24 |

(Continued)

FOREIGN PATENT DOCUMENTS

JP 08-289278 11/1996 ..... H04N 7/173

*Primary Examiner* — Joshua Campbell
(74) *Attorney, Agent, or Firm* — Frommer Lawrence & Haug LLP; William S. Frommer

(57) ABSTRACT

An information signal transmission system and a remote control device for such a system for allowing a viewer to continuously watch, for example, in a bedroom a program the viewer has watched in a living room. A recipient of information is detected referring to identification information set in a remote command device, and monitor devices are alternately switched for continuously providing the viewer with an information signal.

29 Claims, 9 Drawing Sheets

(56) References Cited

U.S. PATENT DOCUMENTS

| | | | | | |
|---|---|---|---|---|---|
| 5,455,619 | A | | 10/1995 | Truckenmiller et al. | 725/14 |
| 5,485,634 | A | | 1/1996 | Weiser et al. | H04B 1/38 |
| 5,493,692 | A | | 2/1996 | Theimer et al. | H04L 9/32 |
| 5,544,321 | A | * | 8/1996 | Theimer et al. | 709/226 |
| 5,550,575 | A | | 8/1996 | West et al. | 725/28 |
| 5,565,908 | A | * | 10/1996 | Ahmad | 725/93 |
| 5,619,251 | A | * | 4/1997 | Kuroiwa et al. | 725/133 |
| 5,646,676 | A | * | 7/1997 | Dewkett et al. | 725/92 |
| 5,663,756 | A | | 9/1997 | Blahut et al. | 348/734 |
| 5,715,020 | A | | 2/1998 | Kuroiwa et al. | 348/734 |
| 5,721,583 | A | | 2/1998 | Harada et al. | 725/24 |
| 5,731,764 | A | * | 3/1998 | Tanaka | 340/3.9 |
| 5,768,224 | A | | 6/1998 | Tanaka et al. | 369/2 |
| 5,828,403 | A | | 10/1998 | DeRodeff et al. | 725/131 |
| 5,883,621 | A | | 3/1999 | Iwamura | 725/37 |
| 5,915,206 | A | * | 6/1999 | Diehl et al. | 725/80 |
| 5,920,800 | A | * | 7/1999 | Schafer | 725/121 |
| 5,949,475 | A | * | 9/1999 | Hatanaka et al. | 348/14.07 |
| 6,124,854 | A | * | 9/2000 | Sartain et al. | 715/716 |
| 6,286,142 | B1 | | 9/2001 | Ehreth | 725/78 |
| 6,359,661 | B1 | | 3/2002 | Nickum | 348/734 |
| 6,377,861 | B1 | * | 4/2002 | York | 700/83 |
| 2001/0012447 | A1 | * | 8/2001 | Horiguchi et al. | 386/125 |
| 2005/0076127 | A1 | * | 4/2005 | Wilson et al. | 709/227 |

* cited by examiner

INFORMATION SIGNAL TRANSMISSION SYSTEM AND REMOTE CONTROL DEVICE FOR THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a Continuation of U.S. Ser. No. 08/977,591, filed on Nov. 25, 1997, now U.S. Pat. No. 7,194,755, which is hereby incorporated by reference in its entirety herein.

BACKGROUND OF THE INVENTION

1. Field of the Invention

The present invention relates to an information signal transmission system and a remote control device for the information signal transmission system and finds applications in a system of video-handling devices that are interconnected using IEEE (the Institute of Electrical and Electronics Engineers) 1394, High Performance Serial Interface Bus Standard (hereinafter simply referred to as IEEE1394). The present invention detects a recipient of information, and provides continuous information signal by switching devices in accordance with the recipient of information. For example, a program that has been enjoyed by a viewer in a living room may be continuously enjoyed by the viewer in a bed room with a simple operation. The present invention enhances ease of use in this type of network.

2. Description of the Related Art

When a diversity of video-handling devices including a television tuner, a monitor device, and an optical disk device are arranged into an audio-visual (AV) system, final output devices are typically arranged in the center of the system with the remaining devices around them mutually connected via dedicated lines.

More particularly, when the AV system is constructed of video-handling devices, video sources such as a television tuner and an optical disk device output a video signal and audio signal to a monitor device as a final output device. The monitor device is thus provided with a plurality of video input terminals and a plurality of audio input terminals, through which the video signal and audio signal are supplied by the video and audio sources.

A video-handling device such as an optical disk device having a recording capability is connected to an output terminal of a monitor device or directly to a video source such as a tuner to receive a video signal and an audio signal. In such a connection, the video-handling device transmits the video signal and audio signal over a shielded wire or a coaxial cable to reduce noise ingress.

In a camera-integrated VCR that processes a video signal in the form of digital signal, the input and output of the video signal and audio signal are performed through an interface specified by IEEE1394 Standard.

IEEE1394 Standard specifies high-speed, low-cost standard serial interface.

Transmission of Signal

According to IEEE1394, two pairs of twisted pair lines are used to transmit signals. To send a signal in one direction, the two pairs are used in a half-duplex fashion. Data is transmitted on one pair while a strobe signal is transmitted on the other pair. By exclusively OR gating both signals, a receiver side reproduces a clock.

Three data rates of 98.304 Mbps (S100), 196.608 Mbps (S200), and 393.216 Mbps (S400) are available and upward compatibility is assured in that a device of one data rate specified works on any of data rates lower than the specified data rate.

Connection of Device

Each device has up to 26 ports, and has a maximum of 63 devices connected with ports fully used. Devices are flexibly connected as long as no loop connection is used and the number of connection stages is not greater than 16.

According to IEEE1394, buses are initialized when the devices are connected, and the devices are connected in a tree structure in which one device is handled as a root device with the child and then grand child devices connected under the root device. The addresses are automatically assigned to the connected devices. In this way IEEE1394 features a large flexibility in cable connection and setting involved in connection is automatically performed.

1394 Communication

IEEE1394 allows a signal sent by one device to be relayed to another device so that the same signal is communicated to all devices within a network. More particularly, the network logically work as a buslike manner though it is electrically connected in a point-to-point manner. For this reason, each device has to arbitrate the right to use the bus prior to a start of transmission.

To get the right to use the bus, a device waits for the bus to be emptied and issues a request signal to its parent device. Upon receiving the request signal, the parent device relays it to its own parent device and the request signal thus reaches the root device. The root device returns a permission signal in response to the request signal, and the device that receives the permission signal starts communication. When a plurality of devices concurrently issue request signals, all requests except one are rejected.

Real Time Processing

In IEEE1394, a plurality of devices seeking the bus access right uses one bus on a time division multiplex basis. To transmit data, such as an audio signal and video signal, which requires real time processing, communication should be guaranteed for a certain period of time to prevent data from missing.

Data requiring real time processing is handled through transmission method called isochronous transmission. A node that manages this transmission is selected during the initialization stage of the bus. A device that transmits in isochronous transmission is assigned necessary band by the managing node. The root device transmits a cycle start packet every 125 μs, and the band-assigned device transmits an isochronous packet in succession to the cycle start packet.

In this way the band-assigned device has the chance of transmission every 125 μs. When the overall capacity of the bands used in isochronous transmission exceeds the bus capacity, band assignment cannot be performed and isochronous transmission cannot be started.

In such an IEEE1394 interface, one bus is shared by a plurality of devices on a time-division multiplex basis, and the devices are connected in a ring configuration or a star configuration to form a network. The video-handling devices are also configured in the same way.

Likewise, a network may be easily constructed in a single home. For example, a video signal reproduced by an optical disk device placed in a living room may be viewed in a monitor device in a bed room.

It would be convenient if a user could continuously watch in the bed room with an easy operation a program that has been viewed from the optical disk device in the living room.

SUMMARY OF THE INVENTION

Accordingly, it is an object of the present invention to provide an information signal transmission system that provides an information signal such as a continued video signal with devices switched, and a remote control device adapted to such an information signal transmission system.

To achieve the above object, the information signal transmission system of the present invention comprises recipient detecting means for detecting a recipient of the information signal, wherein the information signal that has been supplied to the recipient by a first device is continuously supplied to the recipient by a second device, based on the result detected by the recipient detecting means.

The recipient of the information signal is detected, and the information signal that has been supplied to the recipient by the first device is continuously supplied to the recipient by the second device, based on the detected result by the recipient detecting means. Even when the recipient moves, the information provided by the first device is continuously provided by the second device.

The remote control device of an information signal transmission system of the present invention transmits a remote control signal to which is added an identification code identifying a recipient of the information signal.

The remote control signal to which is added the identification code identifying the recipient of the information signal is transmitted; thus, the operation of the entire system is smoothly switched by allowing to provide the information signal the device that receives the remote control signal.

DESCRIPTION OF THE PREFERRED EMBODIMENTS

Figure 1:
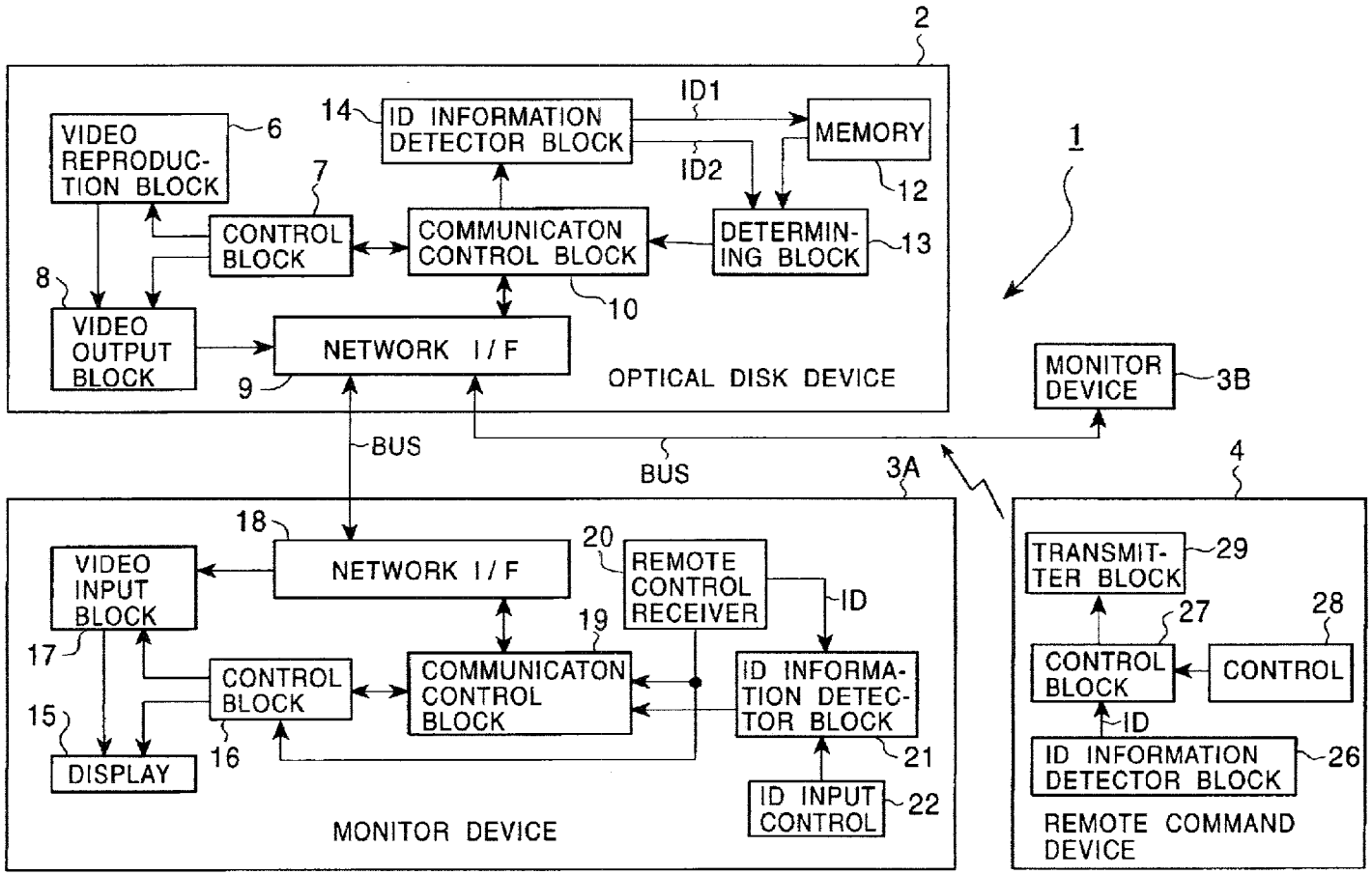
FIG. 1 is a block diagram showing an audio-visual (AV) system of a first embodiment of the present invention.

Referring to the drawings, the embodiments of the present invention are now discussed.

First Embodiment

FIG. 1 is a block diagram showing an audio-visual (AV) system of a first embodiment of the present invention.

The AV system comprises an optical disk device 2, and monitor devices 3A and 3B which are connected through a bus BUS specified in IEEE1394 to form a network. The operation of the AV system 1 is switched by operating a remote command device 4 or by directly operating each device. The video signal and audio signal reproduced by the optical disk device 2 is monitored on the monitor device 3A in the same room as the optical disk device 2 or on the monitor device 3B in another room.

In the optical disk device 2, a video reproducing block 6 under the control of a control block 7 switches its operation to reproduce and output a video signal and audio signal from an optical disk. Under the control of the control block 7, the video output block 8 switches its operation to code output data of the video reproducing block 6 and provide its output to a network interface 9.

The control block 7, constructed of a microcomputer that controls the optical disk device 2, switches the general operation of the optical disk device 2 in response to the operation of an unshown control arranged on the optical disk device 2 or in response to a control command input by a communication control block 10.

The network interface 9, constructed of input/output circuits for performing communication process as specified in IEEE1394, communicates with network interfaces of the devices connected to the bus BUS when the devices are put to an idle state with the optical disk device 2 connected to the bus BUS, and gets a device address for the optical disk device 2.

Each device address is constituted by a bus address for identifying each bus connected in a bridge and a node address on each bus. Double addressing for another device is precluded. In this network, buses are connected in a bridge, and a video signal and audio signal are exchanged between buses, and for this reason each bus needs identifying by the respective bus address.

Through communications with other video-handling devices, the network interface 9 secures a device address that is assigned to none of the other devices, and holds the secured device address. The network interface 9 monitors the status of the bus BUS, and detects any decoupling action in which any device is decoupled from the bus BUS. Based on the detected status, the network interface 9 newly performs a device address detection process.

With the obtained device address as a reference, the network interface 9 collects data output by the other video-handling devices constituting the network and then outputs it to the communication control block 10. The network interface 9 adds a device command output by the communication control block 10 to send to the other video-handling devices the data output by the communication control block 10 and the data output by the video output block 8.

Figure 2:
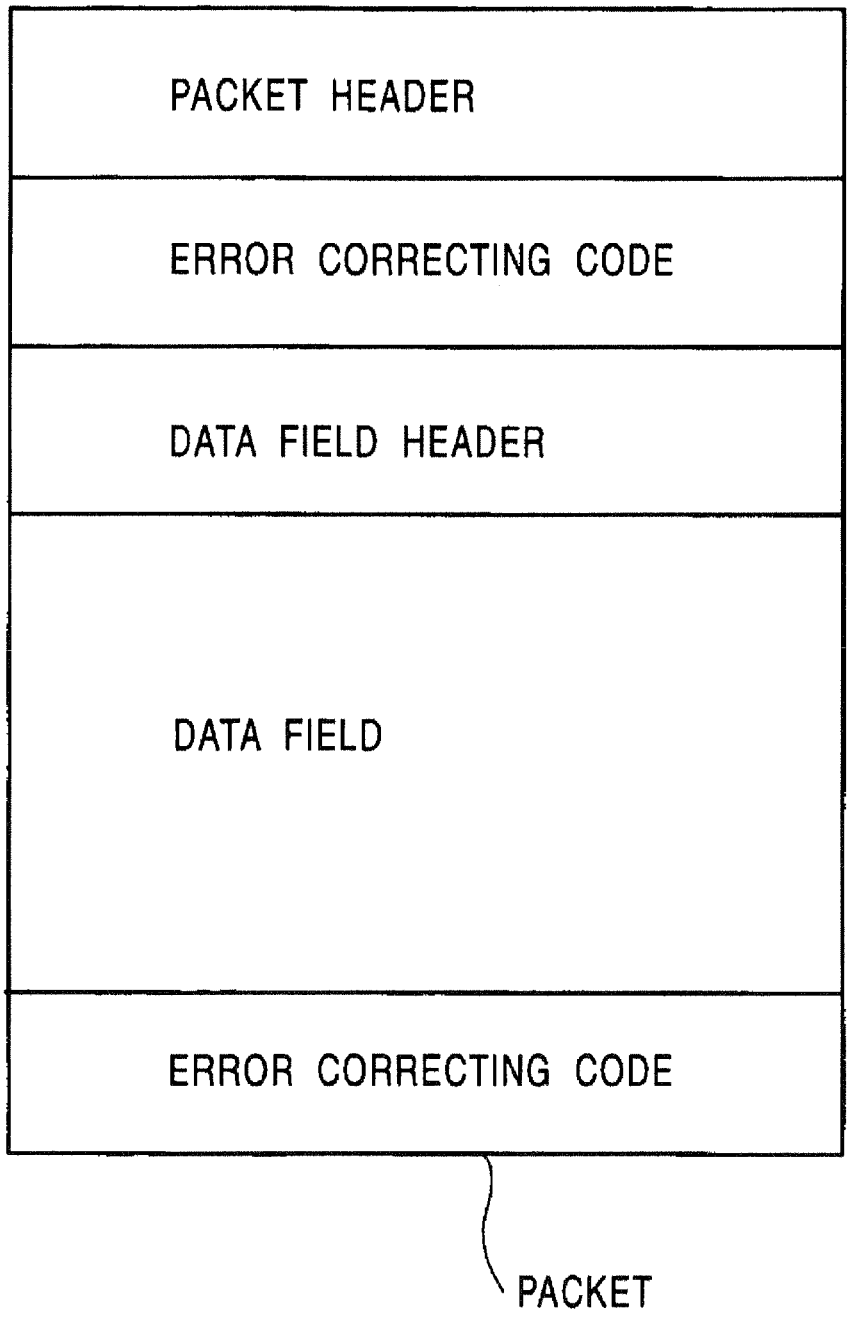
FIG. 2 is a diagram showing a packet for use in the AV system of FIG. 1.

The AV system 1 is thus designed to transmit and receive a diversity of data in packet, and each packet includes, in its header portion, header data followed by an error correcting code for the header data as shown in FIG. 2. Next, a header for a data field comes in, followed by the data field and then an error correcting code for the data field. When a video signal, an audio signal, a control command or the like is sent to each device, or when a device address is secured, these video signal, audio signal, control command or the like are assigned to the data field of each packet, and the device address of a destination is set in the header of the data field.

The network interface 9 monitors the device address set in the header of the data field, and after collecting a packet designating the optical disk device 2, the network interface 9 error-correction processes the data assigned to the data field and then outputs the corrected data to the communication control block 10. In this way the network interface 9 reports the control command and the device address of the destination to the communication control block 10 based on the data assigned to the data field. The network interface 9 assigns the video signal and audio signal to the data field and sets the destination device address in the header of the data field, and then sends the video signal and audio signal to the device designated by the device address.

A memory 12 holds identification information ID1 of the recipient of the program of the optical disk. The identification information ID is ID1 assigned by the remote command device 4, and in this embodiment, users hold their respective command devices. The memory 12 records which user is currently provided with the video signal and audio signal. The memory 12 in an initial state records its default value.

A determining block 13 determines whether identification information ID2 detected by a ID information detector block 14 matches the identification information ID1 stored in the memory 12, and outputs the result. The determining block 13 outputs a determination result of match when the memory 12 stores the default value. The determining block 13 thus determines whether the control command input from other video-handling device comes from the recipient of the program of the optical disk.

The ID information detector block 14 detects and outputs identification information ID1 and ID2 from the data input supplied from the network interface 9 to the communication control block 10.

The communication control block 10 analyzes the data of the data field supplied via the network interface 9 and issues a control command to the control block 7 as necessary. Through data communication with the control block 7, the communication control block 10 sends a diversity of data via the network interface 9 as necessary.

More particularly, the communication control block 10 acquires the data of the data field of a packet from the network interface 9 when the packet designating the optical disk device 2 comes in. The communication control block 10 analyzes the data of the data field when the determining block 13 outputs a match as a result of determination. When the data of the data field is a control command requesting a reproduction operation of the optical disk device, the communication control block 10 compares attribute information set in the data field with attribute information of the optical disk device 2 to determine whether connection to a device requesting reproduction is possible.

The attribute information indicates attributes of each device. In case of the optical disk device, the attribute information includes the manufacturer's name of the optical disk device 2, a type code indicative of the type of each device (tuner, monitor device), a format of output data (MPEG 1(ISO/IEC 11172), MPEG2(ISO/IEC13818), MPEG4, G4, digital audio interface (IEC958) or the like). The communication control block 10 determines whether connection to the device is possible by determining whether the output data format set in the attribute information matches its own format.

When it is determined that connection to the device is possible, the communication control block 10 sets the device address of the device requesting reproduction as a destination device address, issues a response control command, and then controls the control block 7 to reproduce from an optical disk, sets the same device address in the network interface 9, and then sends a video signal and audio signal reproduced from the optical disk to the device requesting reproduction.

By repeating the above process steps, the communication control block 10 reproduces from the optical disk or suspends the reproduction process, through data communication with the control block 7 in response to a request from another device.

When the determining block 13 gives no match, the communication control block 10 ignores the control command input from another device. To improve ease of use, the optical disk device 2 modifies the recipient of the video signal and audio signal only when the remote command device 4 to which the identification information ID1 registered in the memory 12 is assigned is operated. When it is determined from the attribute information that connection to the device is difficult, the communication control block 10 notifies so the corresponding device.

Although the monitor devices 3A and 3B are identically constructed, both have different device addresses and are installed in different rooms. The monitor device 3A will be discussed mainly, and the common portion therebetween will be discussed representatively in the discussion of the monitor device 3A.

In the monitor device 3A, a display 15 under the control of a control block 16 switches its operation, presenting a video signal input from a video input block 17 and outputting an audio signal also input from the video input block 17. The video input block 17 under the control of the control block 16 switches its operation, receiving the video signal and audio signal from the bus BUS via a network interface 18. The video input block 17 further decodes the video signal and audio signal to present them on the display 15. The monitor device 3A thus monitors the video signal and audio signal reproduced in the optical disk device 2.

A remote control receiver 20 receives a remote control signal sent by the remote command device 4, and feeds the received result to the control block 16, a communication control block 19 and an ID information detector block 21.

The control block 16, constructed of a microcomputer that controls the operation of the monitor device 3A, controls the switching of the general operation of the monitor device 3A in response to an unshown control arranged on the monitor device 3A. The control block 16 detects a control command assigned to the monitor device 3A from the received result, and controls the general operation of the monitor device 3A for switching according to the control command. The control block 16 also switches the general operation of the monitor device 3A in response to a control command input from the communication control block 19.

Like the network interface 9 of the optical disk device 2, the network interface 18 acquires a device address. The network interface 18 monitors the bus BUS, receives a packet assigned to the monitor device 3A, and outputs data assigned to the data field of the packet to the communication control block 19 and video input block 17. The network interface 18 supplies to the video input block 17 the video signal and audio signal that are destined to the monitor device 3A from the optical disk device 2, and acquires a control command issued to the monitor device 3A from another device.

The network interface 18 under the control of the communication control block 19 issues the output data of the communication control block 19 to a device designated by the communication control block 19. In this way, the monitor device 3A issues the control command to another device.

An ID input control 22 comprises a plurality of control elements arranged on the monitor device 3A, each element corresponding to its respective identification information ID. In the ID input control 22, the identification information ID by each control element is set to correspond to the identification information ID of the respective remote command device 4. In the monitor device 3A, unshown control elements are operated after the ID input control 22 is selected, and the operation of the control elements is detected by the control block 16. The control block 16 reports the corresponding control command to the communication control block 19, which in turn adds the identification information correspondingly to the control command.

The ID information detector block 21 detects the operation of the ID input control 22 and reports the identification information corresponding to it to the communication control block 19. The ID information detector block 21 detects the identification information added to the remote control signal of the remote command device 4 from the result received by the remote control receiver 20, and outputs it to the communication control block 19.

The communication control block 19 analyzes the control command input via the remote control receiver 20, and outputs the control command to the network interface 18 based on the analysis result. The communication control block 19 adds the identification information detected by the ID information detector block 21, the attribute information and device address of the monitor device 3A, thereby issuing a control command. When a reproduction command of the optical disk device 2 is issued from the remote command device 4, for example, the communication control block 19 controls the control block 16 to feed main power to the monitor device 3A, and adds the identification information, the attribute information and the device address to the reproduction command and then transfers the resulting reproduction command to the optical disk device 2. The identification information and attribute information are analyzed by the optical disk device 2. When a response command is received from the optical disk device 2, the video signal and audio signal the optical disk device 2 sends in succession are supplied to the user.

The monitor devices 3A and 3B constitute respectively a first and second device, each of which provides the video signal and the audio signal constituting information signal to the user.

The remote command device 4 holds its own assigned identification information ID in an ID information holder block 26. A control block 27 drives a transmitter block 29 in response to the operation of a control 28, thereby transmitting a remote control signal to the monitor device 3A, for example. The control block 27 adds the identification information held by the ID information holder block 26 to the control command borne by the remote control signal and then transmit them.

The remote command device 4 and the ID information detector block 14 of the optical disk device 2 constitute recipient detecting means for detecting a recipient of the video signal and audio signal reproduced by the optical disk device as video signal acquisition means, Furthermore, the ID input control 22 and the ID information detector block 14 of the optical disk device 2 constitute the recipient detecting means for detecting the recipient of the video signal and audio signal.

In the AV system 1 thus constructed (FIG. 1), the optical disk device 2 and other devices are connected to the bus BUS and the system is powered for idling, and the network interfaces 9 and 18 interrogate the bus BUS for, the device addresses of the devices connected thereto, and register any device address, if unregistered in the bus BUS, to the respective device. The network interfaces 9, 18 monitor the status of the bus BUS, and re-register the device addresses when the connection of the bus BUS is modified.

Figure 3:
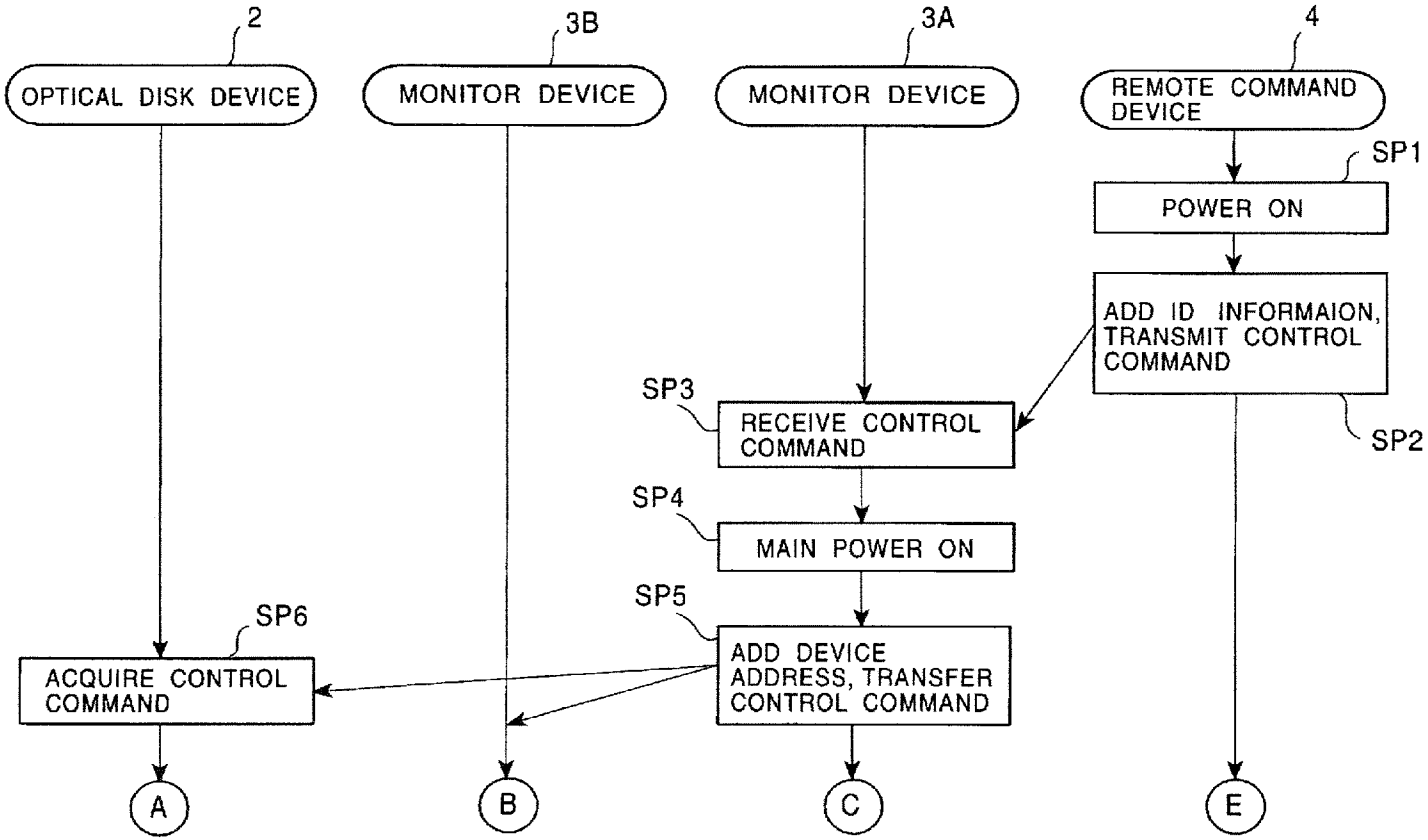
FIG. 3 is a timing diagram illustrating the operation of the AV system of FIG. 1.

When a user switches the optical disk device 2 for power on by manipulating a control on the remote command device 4 with the device address thus registered in step SP1 as shown in FIG. 3, the remote command device 4 goes to step SP2, where the remote command device 4 adds the identification information to the corresponding control command and transmits them as a remote control signal.

In step SP3, the remote control signal is received by the remote control receiver 20 of the monitor device 3A placed in the same room as the remote command device 4, and the identification information ID is detected by the ID information detector block 21 connected to the remote control receiver 20. With the optical disk device 2 switched for power on, the control command borne by the remote control signal is acquired by the communication control block 19. In step SP4, the communication control block 19 controls the control block 16 to switch the monitor device 3A for main power on.

In step SP5, the identification information detected by the ID information detector block 21, the attribute information and device address of the monitor device 3A are added to the control command, and these data are assigned to the data field, and the device address of the optical disk device is assigned to the destination address before being sent to the bus BUS. In this way the control command received by the remote control receiver 20 is transferred to the optical disk device 2.

Figure 4:
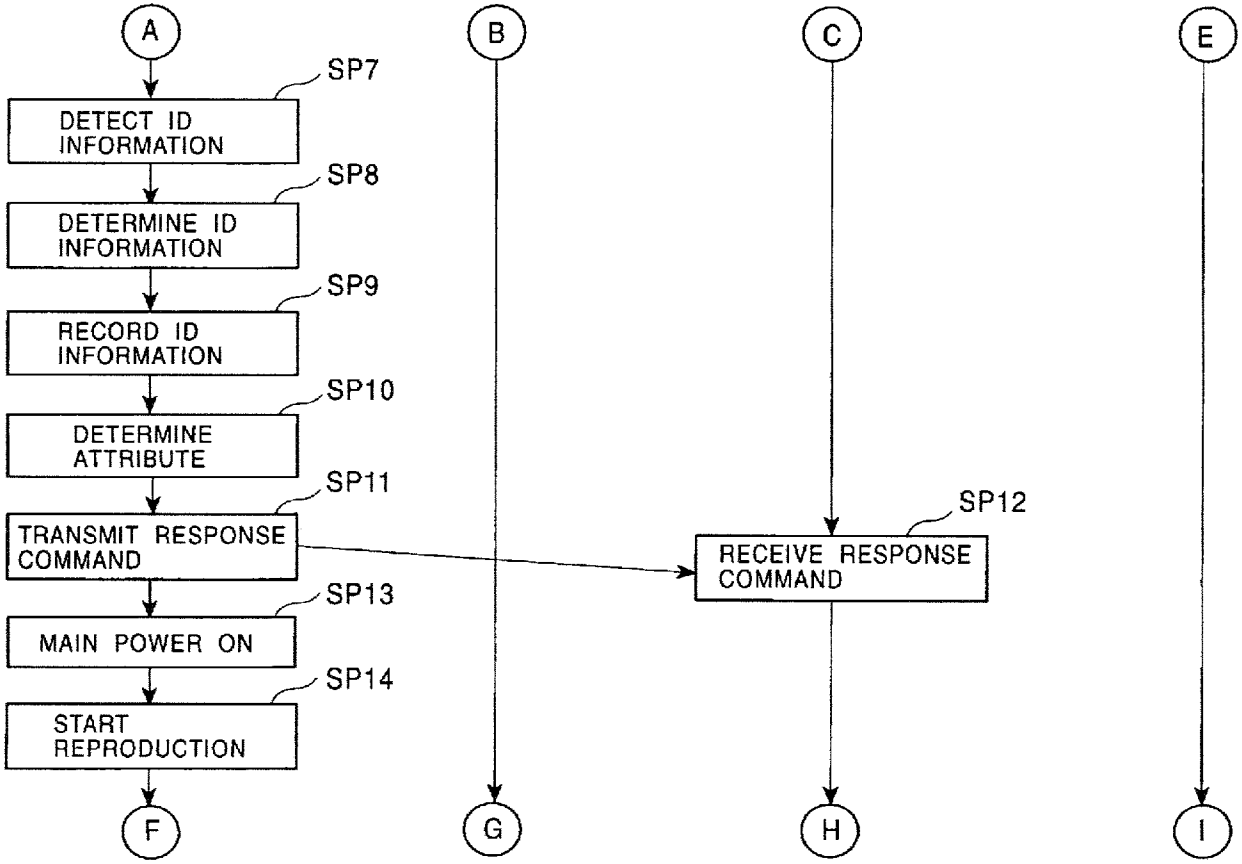
FIG. 4 is a continuation of the timing diagram of FIG. 3.

In step SP6, the network interface 9 of the optical disk device 2 acquires the packet to which the control command is assigned, and the control command, the attribute information and the device address assigned to the data field are input to the communication control block 10. As shown in FIG. 4, the identification information ID out of these data is detected by the ID information detector block 14 in step SP7.

The determining block 13 determines in step SP8 whether the identification information ID matches the identification information stored in the memory 12. In the initial state, a match is obtained according to the default value set in the memory 12. In step SP9, the identification information ID1 is stored in the memory 12.

To determine whether the optical disk device 2 is connectable to the monitor device 3A, it is determined in step SP10 whether the attribute information of the monitor device 3A matches the attribute information of the optical disk device 2. When it is determined that both are connectable to each other, the response command is sent to the monitor device 3A in step SP11.

The monitor device 3A receives the response command in step SP12, and the optical disk device 2 notifies the monitor device 3A that the video signal and audio signal will be transferred to the monitor device 3A. In step SP13, the communication control block 10 controls the control block 7 to switch the optical disk device 2 for main power on, and in step SP14, the video reproducing block 6 starts reproduction of the optical disk.

Figure 5:
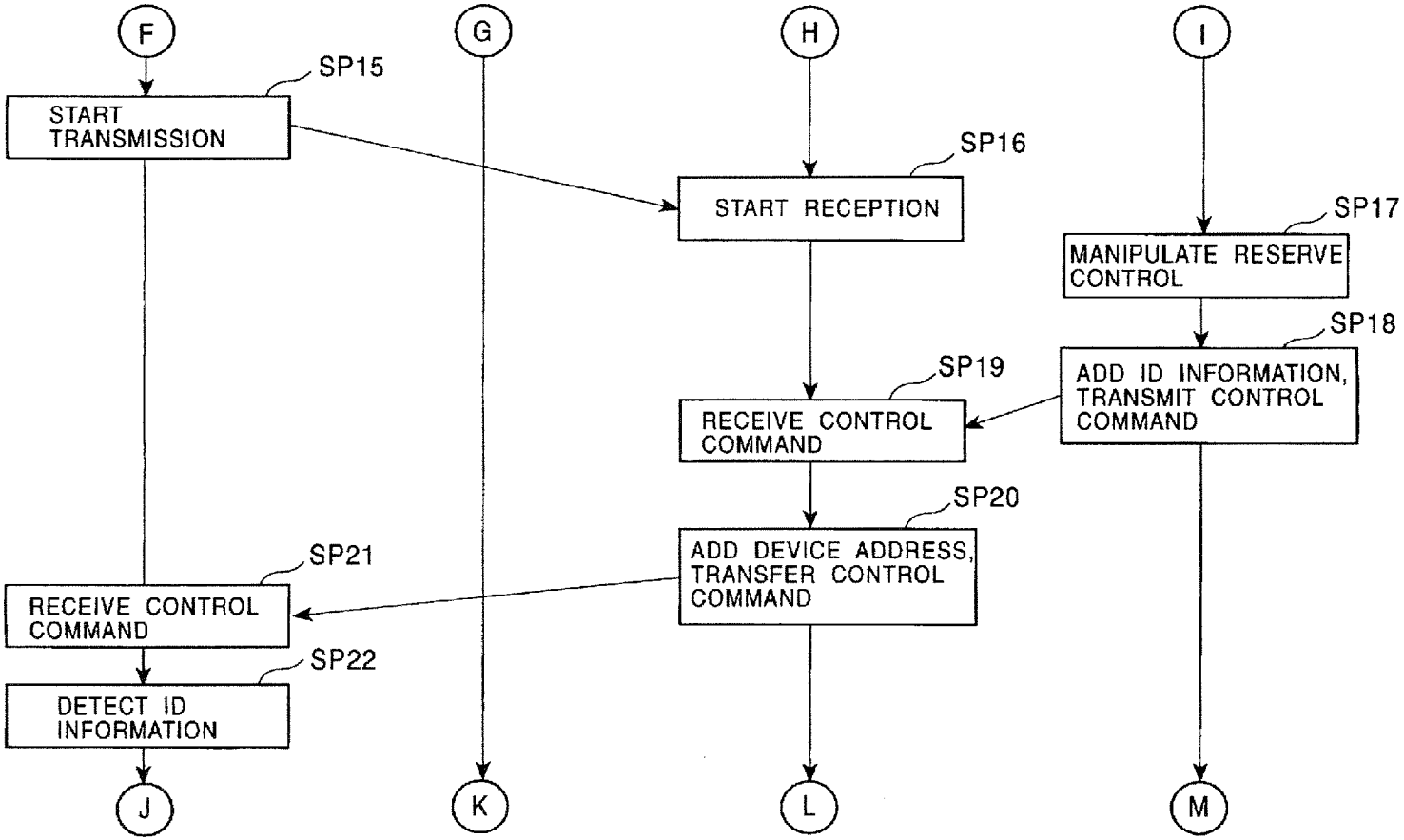
FIG. 5 is a continuation of the timing diagram of FIG. 4.

Referring to FIG. 5, when the reproduction of the optical disk starts in this way, the network interface 9 sends the reproduced video signal and audio signal in step SP15, while the monitor device 3A starts receiving the sent video signal and audio signal in step SP16 to present them on the display 15.

With the reproduction of the optical disk starting, the user operates a reserve control on the remote command device 4 in step SP17. In step SP18, the remote command device 4 sends the control command to which the identification information is added.

When the user is present in the same room where the monitor device 3A is placed, the monitor device 3A receives the remote control signal in step SP19. The device address and the attribute information are added to the control command of the remote control signal in step SP20 and the resulting signal is sent to the optical disk device 2.

In step SP21, the control command is acquired by the communication control block 19 of the optical disk device 2, and is then input to the communication control block 10 of the optical disk device 2. The ID information detector block 14 detects the identification information ID2 from the control command in step SP22.

Figure 6:
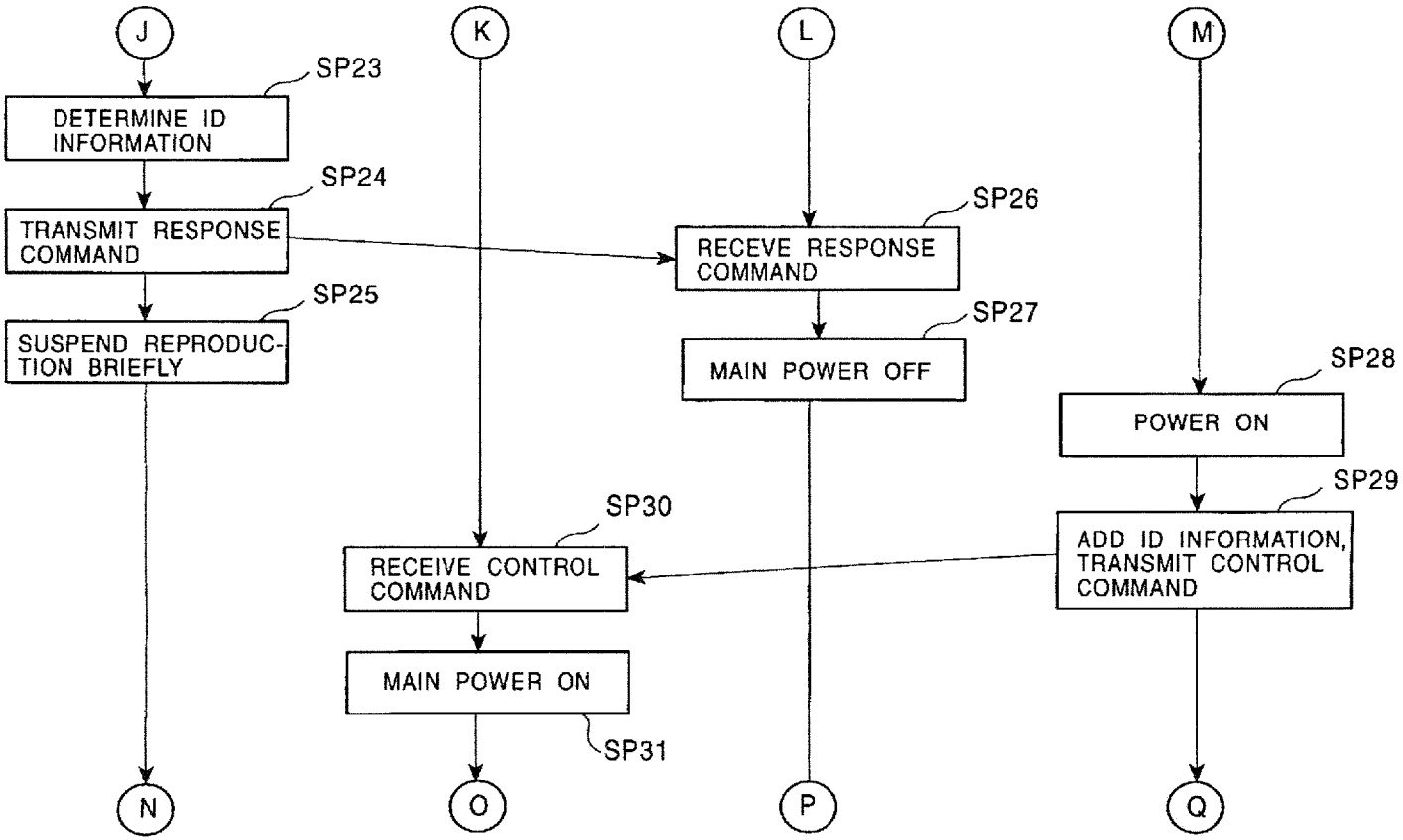
FIG. 6 is a continuation of the timing diagram of FIG. 5.
Figure 7:
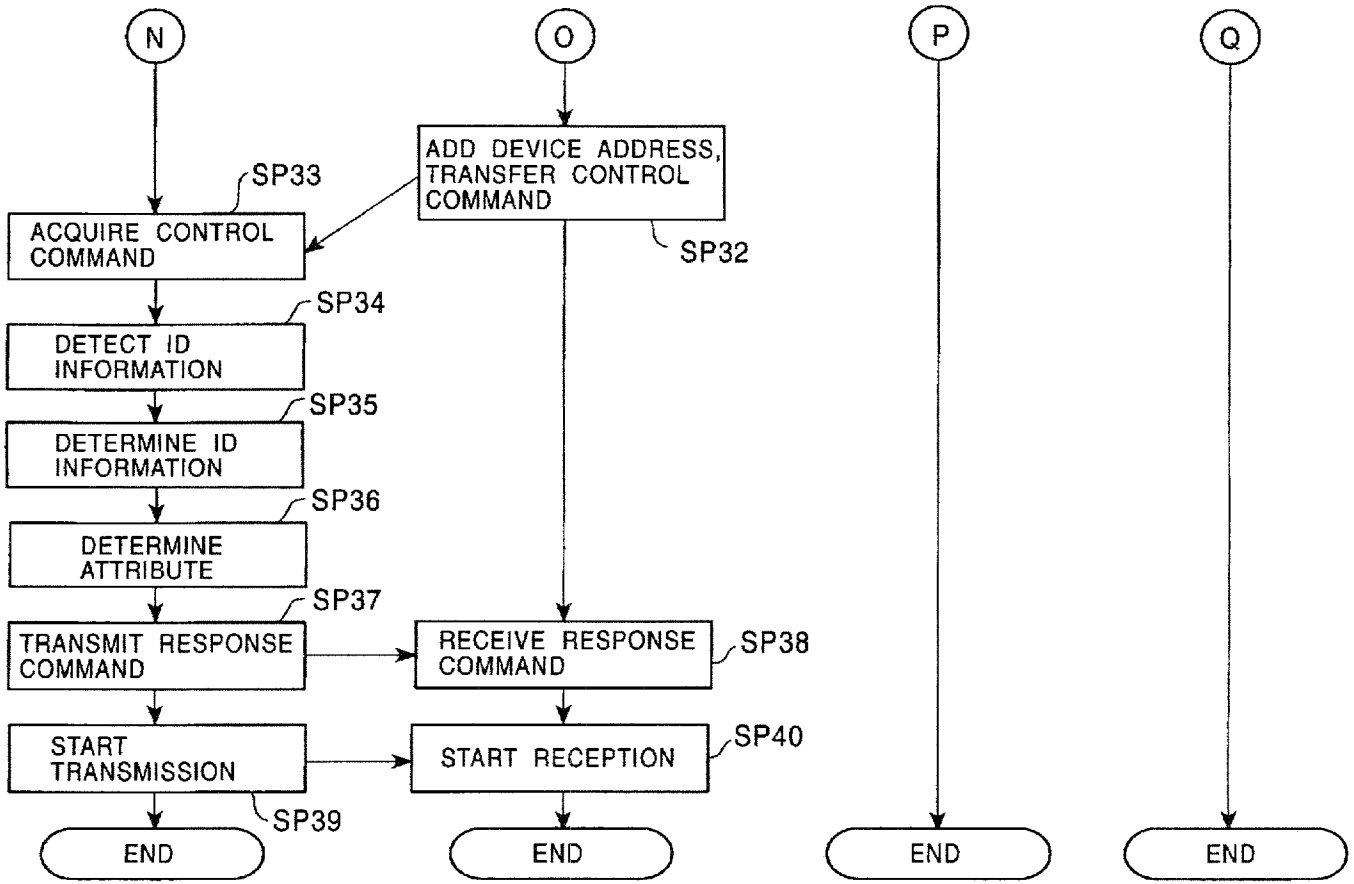
FIG. 7 is a continuation of the timing diagram of FIG. 6.

The determining block 13 determines in step SP23 in FIG. 6 whether the detected identification information ID2 matches the identification information ID1 stored in the memory 12. When it is determined that both match, the communication control block 10 issues a response command to the monitor device 3A in step SP24, and the reproduction of the optical disk is temporarily suspended in step SP25.

In the AV system 1, once one individual starts the use of the system, the operation of the system is not interfered with by some one else, and thus the ease of use is accordingly assured.

The response command is fed to the communication control block 19 via the network interface 18 of the monitor device 3A in step SP26, and causes the monitor device 3A to be switched for main power off in step SP27.

With the above setting, if the user goes to a bed room where the monitor device 3B is placed and operates the remote command device 4 in step SP28, the control command with the identification information added is sent by the remote command device 4 in step SP29. The control command is received by the monitor device 3B in the bed room.

The monitor device 3B is switched for main power on by the control block 16 in response to the control command in step SP31. The communication control block 19 adds to the control command the attribute information and device address of the monitor device 3B and sends them to the optical disk device 2 in step SP32.

The control command is acquired by the optical disk device 2 in step SP33, and is then input to the communication control block 10 of the optical disk device 2. The ID information detector block 14 detects the identification information ID2 from the control command in step SP34.

The determining block 13 determines in step SP35 whether the identification information ID2 matches the identification information ID1 stored in the memory 12. When a match is obtained, the communication control block 10 analyzes the attribute information of the control command in step SP36 to determine whether the optical disk device 2 is connectable to the monitor device 3B to which the control command is transferred.

When it is determined that both are connectable to each other, the communication control block 10 issues a response command to the monitor device 3B in step SP37, and the response command is acquired by the monitor device 3B in step SP38. The optical disk device 2 notifies the monitor device 3B that the video signal and audio signal will be transferred to the monitor device 3B before the video signal and audio signal are actually transferred in step SP39. When the signal transfer starts, the suspension of the optical disk is released.

The monitor device 3B starts receiving the video signal and audio signal in step SP40. In the AV system 1, the video signal and audio signal reproduced from the optical disk device 2 are continuously enjoyed with the monitor device 3A switched to the monitor device 3B by the simple operation performed on the remote command device 4.

Instead the remote command device 4, the ID input controls 22 arranged on the monitor devices 3A and 3B may be used. By operating the ID input controls 22 for power on on the monitor devices 3A and 3B, for example, the control command with the identification information ID added is generated by the control block 16 and communication control block 19 instead of the control command from the remote command device 4, and the generated control command is then transferred to the optical disk device 2.

When the remote command device 4 is left and forgotten somewhere, the ID input control 22 may be operated to allow the video signal and audio signal reproduced from the optical disk device 2 to be switchably and continuously viewed on both the monitor devices 3A and 3B.

Receiving a reproduction end control command, the communication control block 10 of the optical disk device 2 determines that the supply of the video signal and audio signal to the destination device, to which the video signal and audio signal have been supplied, is completed and the communication control block 10 returns the content of the memory 12 to its default value. Another user is now permitted to use the system.

With the above arrangement, the identification information is assigned to the remote command device 4, and the video signal and audio signal from the optical disk device 2 are switchably supplied to the monitor devices 3A and 3B with the identification information as a reference. By the simple operation on the remote command device 4 carried, a particular user continuously watches on the monitor device 3B the video signal and audio signal that were provided on the monitor device 3A. The user thus enjoys the ease of use of the AV system 1.

Through the operation of the ID input controls 22 arranged on the monitor devices 3A and 3B, the control command with the identification information added thereto is issued, and with the identification information as a reference, the video signal and audio signal are switchably supplied to the monitor devices 3A and 3B from the optical disk device 2. By the simple operation on the ID input controls 22, the particular user continuously watches on the monitor device 3B the video signal and audio signal that were provided on the monitor device 3A. The user again enjoys the ease of use of the AV system 1.

Second Embodiment

Figure 8:
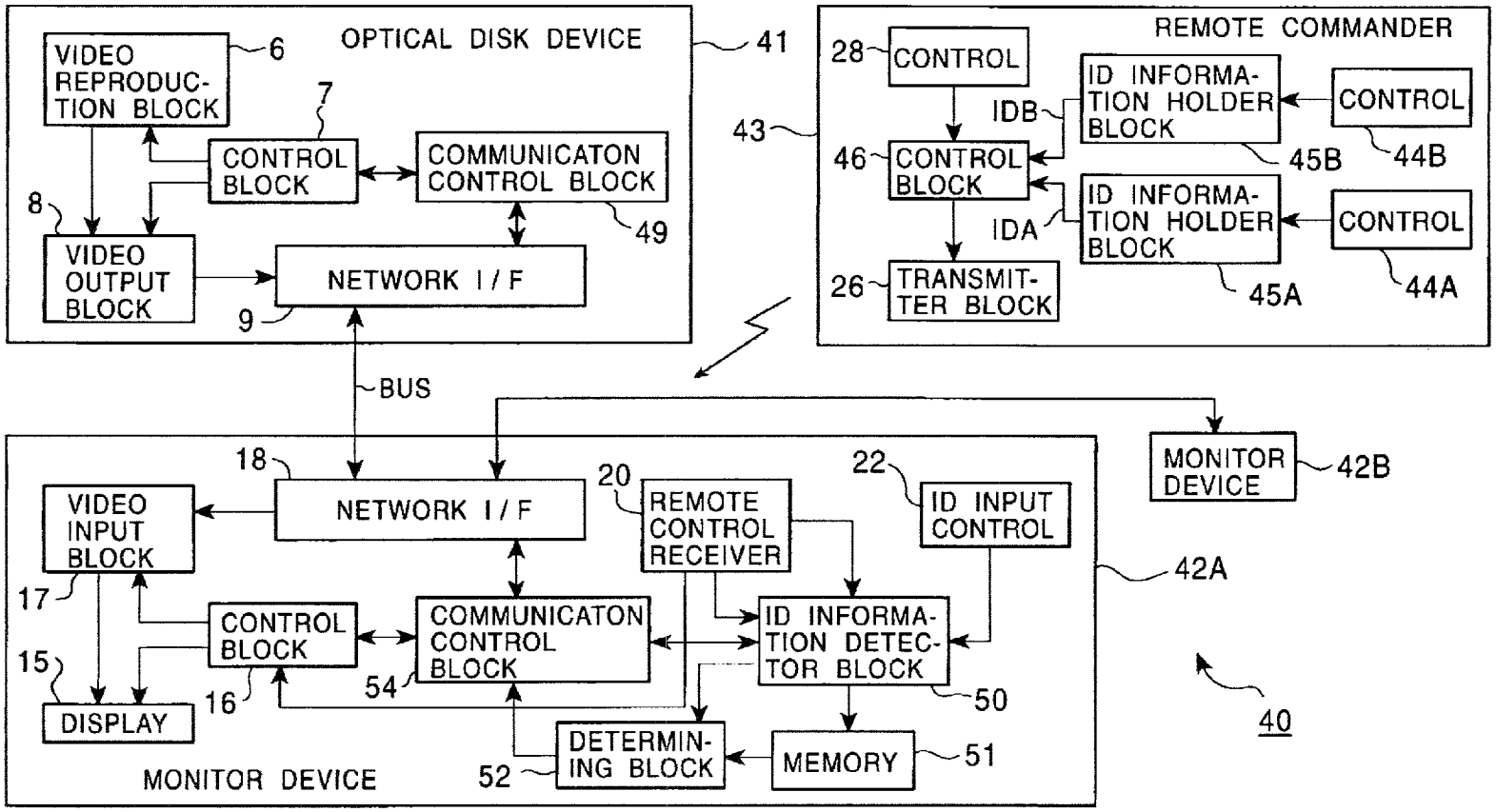
FIG. 8 is a block diagram showing an AV system of a second embodiment of the present invention.

FIG. 8 is a block diagram showing an AV system of a second embodiment of the present invention.

The AV system 40 comprises an optical disk device 41, and monitor devices 42A and 42B which are connected through the bus BUS specified in IEEE1394 to form a network. The operation of the AV system 40 is switched by operating a remote command device 43 or by directly operating each device. In FIG. 8, components identical to those in the first embodiment with reference to FIG. 1 are designated with the same reference numerals, and the description about them is not repeated.

In the AV system 40, the remote command device 43 comprises ID input controls 44A, 44B, . . . , and in response of the operation of each of the ID input controls 44A, 44B, . . . , corresponding ID information holder blocks 45A, 45B, . . . send identification information IDA, IDB, . . . The ID information holder blocks 45A, 45B, . . . are arranged into a memory and register a plural pieces of identification information so that the corresponding identification information is accessed by the operation of the respective controls 44A, 44B, . . . .

When the control 28 is operated, a control block 46 adds, to the control command corresponding to the control 28, the identification information output by the ID information holder blocks 45A, 45B, . . . to generate a remote control signal, and outputs it via the transmitter block 29. In the AV system 40, the video signal and audio signal are continuously enjoyed on the monitor devices 42A and 42B, by the selection operation of the controls 44A, 44B, . . . without the need for carrying the remote command device 43.

In this embodiment, the optical disk device 41 is a simplified version of the optical disk device 2 in the first embodiment, namely the optical disk device 2 without the ID information detector block 14, memory 12, and determining block 13. A communication control block 49 analyzes the attribute information of the control command input through the bus BUS to determine whether the connection to the device is possible. After issuing a response command, the communication control block 49 switches the operation of the optical disk device 41.

Each of the monitor devices 42A and 42B is provided with an ID information detector block 50, a memory 51, and a determining block 52. The determination of the information destination from the identification information, performed by the optical disk device 2 in the first embodiment, is performed by the monitor devices 42A and 42B in the AV system 40. Based on the determination result, the operation of the optical disk device 2 is switched so that the reproduced signal that has been monitored on the monitor device 42A is continuously monitored on the monitor device 42B.

The ID information detector block 50 in the monitor device 42A has a combination of the ID information detector block 21 in the monitor device 3A and the ID information detector block 14 in the optical disk device 2. More particularly, the ID information detector block 50 detects identification information from the result received by the remote control receiver 20, and outputs it to a communication control block 54, and generates identification information in response to the operation of the ID input control 22 and outputs it to a communication control block 54. The ID information detector block 50 detects the identification information added to the control command acquired through the bus BUS.

The memory 51 holds the identification information, and the entire operation is switched based on the identification information stored in the memory 51 as a reference. The determining block 52 determines a match by comparing the identification information stored in the memory 51 with the identification information detected by the ID information detector block 50, and the determination result is output to the communication control block 54.

When the communication control block 54 receives a control command via the bus BUS in the course of processing the video signal and audio signal output by the optical disk device 41, the communication control block 54 switches the operation of the device in response to the control command only when a match results from the determination process by the determining block 52. When a control command is input through the remote control receiver 20 during the operation of the device, or when the controls are directly operated, the communication control block 54 switches the operation of the device in response to the control command or the operation of the controls only when a match results from the determination process by the determining block 52.

When a control command is input with main power down or when the control is separately operated with main power down, the corresponding identification information is registered in the memory 51, and the operation of the device is switched in response to the control command or the operation of the control.

In the AV system 40, the reproduction of the optical disk starts with the monitor device 42A powered up, the operation of the monitor device 42A is reserved on condition that the same identification information is input, and the operation of the monitor device 42B is started so that the program that has been presented on the monitor device 42A is continuously presented on the monitor device 42B.

According to the arrangement shown in FIG. 8, the same advantage as the first embodiment will be offered if the single remote command device 43 inputs selectively the identification information.

The same advantage as in the first embodiment will be offered event if the identification information is determined in the monitor devices 42A and 42B instead of in the optical disk device 2.

Other Embodiments

In the above embodiments, each remote command device is assigned respective identification number, or a single remote command device is used to selectively input a plural numbers of identification information. The present invention is not limited to these embodiments. Identification information is registered in an IC card, and the IC card is set in a remote command device or a video-handling device to add the identification information to a diversity of control commands.

Figure 9:
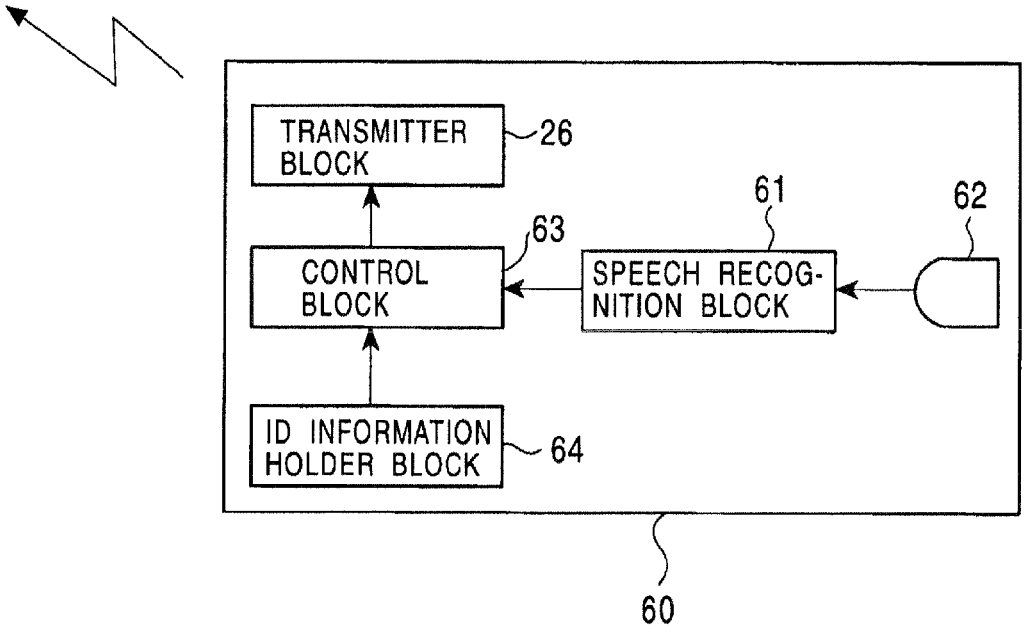
FIG. 9 is a block diagram showing an AV system of another embodiment of the present invention.

Instead of the IC card, a control command is generated based on the result from a speech recognition and the identification information is added to the control command as shown in FIG. 9. More particularly, a speech recognition block 61 recognizes the voice of a user picked up by a microphone 62, and the speech recognition result is sent to a control block 63 in a remote control device 60. The control block 63 generates a control command based on the speech recognition result, and selects the identification information of the user from a plural pieces of identification information stored in an ID information holder block 64. The control block 63 adds the identification information thus selected to the, generated command, and sends them to a transmitter block 26. This arrangement offers the same effect as that of the preceding embodiments.

In the above embodiments, the operation of the optical disk device is temporarily suspended when the destination of the video signal and audio signal is switched between the monitor devices. Alternatively, the process of temporary suspension is may be skipped.

In the above embodiments, the operation of one monitor device is forced to stop before the other monitor device is activated when the destination of the video signal and audio signal is switched between the monitor devices. Alternatively, the other monitor is operated to present the video signal and audio signal as necessary so that both monitor devices present an identical still image, and then the one monitor device that has been viewed may be powered down. If the second embodiment incorporates this method, the one monitor may be powered down under the control of the other monitor device.

In the above embodiments, the monitor device that is continuously viewed is independently powered up. Alternatively, the monitor device that is continuously viewed is powered up under the control of the monitor device that will be switched off, when switching is individually performed on both monitor devices with the destination beforehand known.

In the above embodiments, the two monitor devices are alternately switched on for presenting the video signal and audio signal output from the single optical disk device. The present invention finds applications not only in such a system but also an AV system constructed of a diversity of devices. For example, a system may be constructed of a plurality of interconnected television receivers, each including a tuner and a monitor device. To continuously watch the same program with the television receivers switched, data communications are required among television receivers in connection with information with identification information as a reference, for example, about a receiver channel that has been received.

In the above embodiments, the devices are interconnected using IEEE1394 interface in the AV system that incorporates the present invention. The present invention is not limited to such a system. The present invention finds applications in a system that may be constructed of compact disk player, amplifiers, loudspeakers using a diversity of serial interfaces or parallel interfaces, and further in a variety of wire or wireless communication networks.

According to the present invention, the recipient of information is detected referring to the identification information set in the remote command device, and the continued information signal is supplied to the recipient with the devices switched. With a simple operation, a user who watched a program in a living room, for example, can continuously enjoy it in a bed room. The present invention thus offers improved ease of use in this type of network.

What is claimed is:

1. An information signal transmission system, comprising:

a network interface connected to a plurality of presentation devices and a reproduction device through a network, wherein said information signal transmission system provides an information signal reproduced by the reproduction device via one of the presentation devices, and wherein each of the plurality of presentation devices comprises a remote control receiver, wherein said remote control receiver is operable to receive a remote control signal sent by a remote control device, wherein the remote control signal comprises identification data;

a destination object detecting module for detecting a destination object by detecting the identification data associated with a control request in conjunction with controlling the reproduction device, wherein said identification data is used for identifying a destination object of said information signal;

a storage module for storing the identification data;

a determination module for determining the identification data detected by the destination object detecting module and the identification data stored by the storage module;

a control module for controlling output of the information signal via one of the plurality of presentation devices as a function of the identification data, wherein, when the identification data of the remote control signal is detected and a different destination object is identified, reproduction of the reproduction device is suspended, the output of the information signal is switched to a second of the plurality of presentation devices, and suspension of the corresponding reproduction device is released.

2. The information signal transmission system of claim 1, wherein, when said control module receives a reserve request from one of said plurality of presentation devices through said network interface and said reserve request includes identification data indicating said identification code identifying a user, and when said control module receives said pause command indicating said first presentation device, said control module terminates outputting said information signal to said first presentation device through said network interface, such that an information signal module outputs said information signal to a second presentation device from the point in said information signal when said control module stopped outputting said information signal to said first presentation device.

3. The information signal transmission system of claim 1, wherein in response to a control request received via the presentation device except of one of the presentation devices if the determine component determines that the identification data detected by said destination object detecting component matches the identification data stored by said store component.

4. The information signal transmission system of claim 1, wherein an identification module determines that the identification code of said identification module in said reserve request matches the identification code of said identification data stored by said identification module and sends a pause command to said control module, said pause command indicating a first presentation device.

5. A method of transmitting an information signal, comprising:

connecting a plurality of presentation devices to a reproduction device through a network, and wherein each of the plurality of presentation devices comprises a remote control receiver, wherein said remote control receiver is operable to receive a remote control signal sent by a remote control device, wherein the remote control signal comprises identification data, providing an information signal reproduced by the reproduction device via one of the plurality of said presentation devices;

detecting a destination object by detecting the identification data associated with a control request in conjunction with controlling said reproduction device, wherein said identification data is used to identify a destination object of said information signal;

storing the identification data;

determining the identification data detected by the destination object detecting step and the identification data stored in said storing step;

controlling output of the information signal, wherein the controlling step controls the storing step to store the identification data and to output the information signal via the presentation device related to a control request;

detecting the identification data;

wherein the controlling step outputs the information signal via the presentation device as a function of the identification data, wherein, when the identification data of the remote control signal is detected and a different destination object is identified, reproduction of the reproduction device is suspended, the output of the information signal is switched to a second of the plurality of presentation devices, and suspension of the corresponding reproduction device is released.

6. The method of transmitting an information signal of claim 5, wherein, when said control step receives a reserve request from one of said plurality of presentation devices through said network interface and said reserve request includes identification data indicating said identification code identifying said user, an identification step determines that the identification code of said identification data in said reserve request matches the identification code of said identification data stored by said identification step and sends a pause command to said control step, said pause command indicating said first presentation device, and when said control step receives said pause command indicating said first presentation device, said control step causes an information signal outputting step to stop outputting said information signal to said first presentation device through said network interface, such that said information signal outputting step begins to output said information signal to a second presentation device from a point in said information signal when said control step stopped outputting said information signal to said the presentation device.

*7. A method of displaying an information signal on different destination display devices connected in a network, comprising:*

*storing identification data used to identify a destination display device of said information signal;*

*outputting an information signal to a first destination display device via said network;*

*receiving a control request from a second destination display device through said network, said control request including identification data;*

*comparing the identification data in said control request with said stored identification data to detect a match; and*

*suspending the outputting of said information signal to said first destination display device and releasing the outputting of said information signal to said second destination display device via said network if a match is detected;*

*wherein said first destination display device and said second destination display device each includes a control block and a control receiver operable to receive a control signal generated by a user-activated operation and to feed a result of said received control signal to said control block.*

*8. The method of claim 7, wherein said supply of said information signal to said first destination display device is terminated after said information signal has been supplied to said second destination display device.*

*9. The method of claim 7, wherein said supply of said information signal to said first destination display device is terminated after said control request has been received from said second destination display device.*

*10. The method of claim 7, further comprising determining if said second destination display device is operable to display said information signal and then, if it is determined that said second destination display device is operable to display said information signal, supplying said information signal to said second destination display device.*

*11. The method of claim 7, wherein said identification data is generated by circuitry in said second destination display device.*

*12. The method of claim 7, wherein said first and second destination display devices are located in different rooms in a house.*

*13. The method of claim 7, wherein said information signal is provided by a source of audio/video content.*

*14. Apparatus for displaying content on different destination display devices connected in a network, comprising:*

*a memory configured to store identification data used to identify a destination display device of said information signal;*

*a content source configured to output content to a first destination display device via said network;*

*a receiver configured to receive a request from a second destination display device through said network, said request including identification data;*

*a comparator configured to compare the identification data in said request with said stored identification data to detect a match;*

*said content source suspending the supply of said content to said first destination display device and releasing said content to said second destination display device via said network if a match is detected;*

*wherein said first destination display device and said second destination display device each includes a control block and a control receiver operable to receive a control signal generated by a user-activated operation and to feed a result of said received control signal to said control block.*

*15. The apparatus of claim 14, wherein said supply of said content to said first destination display device is terminated after said content has been supplied to said second destination display device.*

*16. The apparatus of claim 14, wherein said supply of said content to said first destination display device is terminated after said request has been received from said second destination display device.*

*17. The apparatus of claim 14, wherein said content source includes a control block configured to determine if said second destination display device is operable to display said content and then, if it is determined that said second destination display device is operable to display said content, said content source supplies said content to said second destination display device.*

*18. The apparatus of claim 14, wherein said second destination display device includes circuitry to generate the identification data.*

*19. The apparatus of claim 14, wherein said first and second destination display devices are located in different rooms in a house.*

*20. The apparatus of claim 14, wherein said content is audio/video content.*

*21. A method of changing over the display of content supplied to a first destination display device connected in a network to display said content on a second destination display device connected in the network, comprising:*

*transmitting from said second destination display device to said network, a control request including identification data used to identify the second destination display device of said content for determining if said second destination display device is permitted to display said content; and*

*suspending the supply of said content to said first destination display device and releasing the supply of said content from said network to said second destination display device if said second destination display device is permitted to display said content;*

*wherein said second destination display device includes a control block and a control receiver operable to receive a control signal generated by a user-activated operation and to feed a result of said received control signal to said control block; and*

*whereby the display of said content is changed over from said first destination display device that had been displaying said content up until the time said control request is transmitted from said second destination display device.*

*22. The method of claim 21, wherein said identification data is generated by circuitry in said second display device.*

*23. The method of claim 21, wherein said second destination display device and said first destination display device are located in different rooms in a house.*

*24. The method of claim 21, wherein said content is provided by a source of audio/video content.*

*25. A first destination display device connected to a network for displaying content that is being supplied to and displayed on a second destination display device, comprising:*

*a transmitter configured to transmit to said network a request including identification data used to identify the first destination display device of said content for use in determining if said first destination display device is permitted to display said content; and*

*a receiver configured to receive said content from said network if said first destination display device is permitted to display said content;*

*wherein said first destination display device includes a control block and a control receiver operable to receive a control signal generated by a user-activated operation and to feed a result of said received control signal to said control block; and*

*whereby the display of said content on said second destination device is suspended to change over the display of said content from said second destination display device that had been displaying said content up until the time said control request is transmitted from said first destination display device, and the display of said content is released to said first destination display device.*

*26. The apparatus of claim 25, wherein said supply of said content to said second destination display device is terminated after said content has been supplied to said first destination display device.*

*27. The apparatus of claim 25, wherein said first destination display device includes circuitry to generate said identification data.*

*28. The apparatus of claim 25, wherein said first destination display device and said second destination display device are located in different rooms in a house.*

*29. The apparatus of claim 25, wherein said content is audio/video content.*

* * * * *